May 29, 1956 — E. J. BURKHEAD — 2,747,927
ROLLER TYPE SUN VISOR
Filed July 13, 1954 — 2 Sheets-Sheet 1
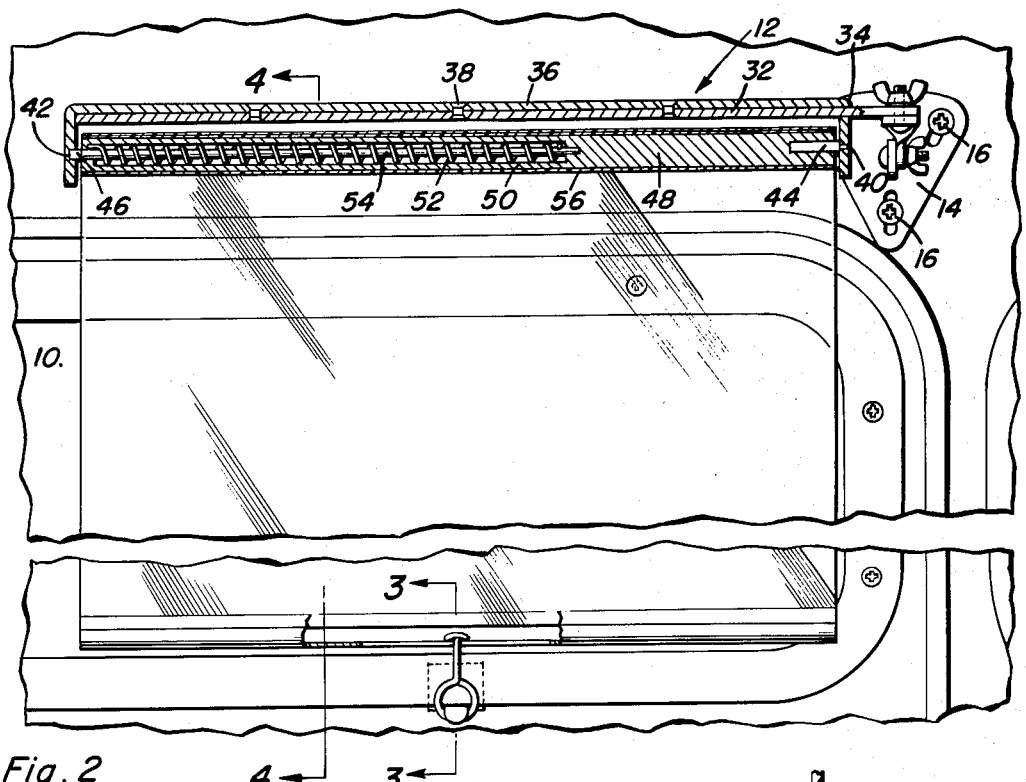
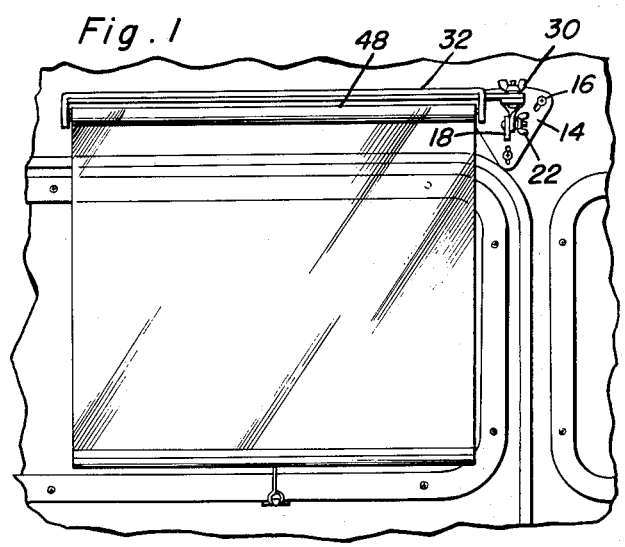
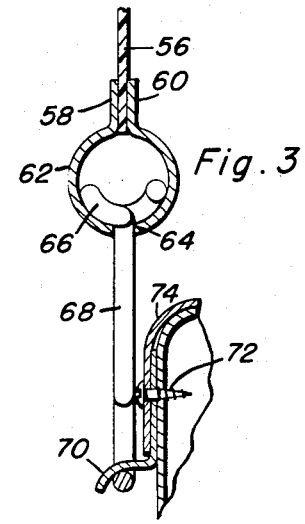
Edward J. Burkhead
INVENTOR.

May 29, 1956　　　　　E. J. BURKHEAD　　　　　2,747,927
ROLLER TYPE SUN VISOR
Filed July 13, 1954　　　　　　　　　　　　　　2 Sheets-Sheet 2

Edward J. Burkhead
INVENTOR.

BY *Clarence A. O'Brien*
*and Harvey B. Jacobson*
Attorneys

United States Patent Office 2,747,927
Patented May 29, 1956

2,747,927

ROLLER TYPE SUN VISOR

Edward J. Burkhead, Lamesa, Tex.

Application July 13, 1954, Serial No. 443,088

2 Claims. (Cl. 296—97)

This invention relates to an attachment for an automotive vehicle, or the like, and more particularly to a novel visor for shielding the eyes of a motorist from unnecessary glare.

The primary object of the present invention resides in the provision of a visor which is adapted to be mounted on a vehicle so as to give protection to a motorist from unnecessary glare passing through either the front windshield, or the side windows of the vehicle and which may be raised and lowered to a desired position while being capable of being rolled completely up and out of the way when not in use.

The construction of this invention features a housing in which a shade roller is mounted, having a shade attached thereto which is made from a suitable glare reducing plastic material which may be polarized if desired so as to reduce the annoying effects of rays of brilliant sunlight and light.

Utilized in the present invention is a novel mounting plate which is adapted to be attached to the conventional anchor plate built into the body of the automotive vehicle. Associated with the mounting plate is a link and a mounting bar which is adapted to extend through slots in the housing to both reinforce the housing and support the housing.

Still further objects and features of this invention reside in the provision of a visor for use in conjunction with automotive vehicles that is strong and durable, simple in construction and manufacture, which may be readily substituted for existing sun visors or which may be readily attached to the visor plates conventionally mounted on vehicles, and which is inexpensive to produce thereby permitting wide distribution and utilization.

These, together with the various ancillary objects and features of the invention which will become apparent as the following description proceeds, are attained by this visor, preferred embodiments of which have been illustrated in the accompanying drawings, by way of example only, wherein:

Figure 1 is an elevational view of the visor comprising the present invention;

Figure 2 is an enlarged sectional view illustrating the construction of the sun visor in greatest detail;

Figure 3 is an enlarged vertical sectional view as taken along the plane of line 3—3 in Figure 2;

Figure 5:
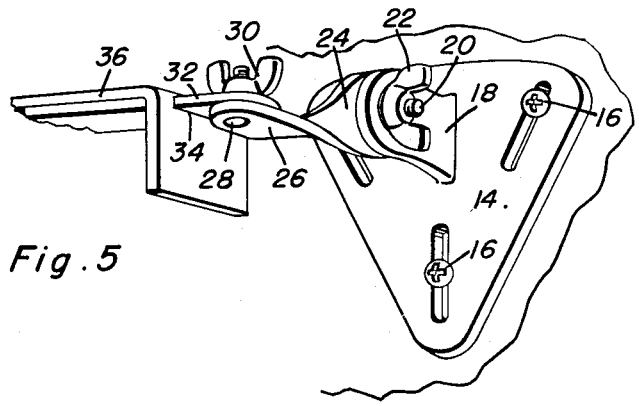
Figure 5 is a perspective view of the mounting plate and associated elements.

With continuing reference to the accompanying drawings wherein like reference numerals designate similar parts throughout the various views, and with initial attention to Figures 1 and 2 it will be noted that there is, as is generally provided on motor vehicles, a windshield as at 10 in association with which the present invention generally designated by reference numeral 12 is adapted to be utilized. This visor includes a mounting plate 14 which is adapted to be secured by suitable screws as at 16 to the anchor plate (not shown) incorporated in the vehicle on which the invention is mounted. The mounting plate 14 as can be best seen in Figure 5 has an ear 18 extending outwardly therefrom which is apertured for reception of a bolt 20 which together with a wing nut 22 holds a convoluted link 24 in an adjusted pivotal relation with respect to the ear 18. The link 24 is twisted so that it provides a horizontal surface as at 26 through which a bolt 28 extends which in conjunction with the wing nut 30 holds a mounting bar 32 in a pivotally adjustable relationship. The mounting bar 32 is adapted to extend through a slot 34 in a substantially U-shaped housing 36 and is held to the housing by suitable rivets or fasteners as at 38.

The housing 36 is provided with an aperture as at 40 and a recess as at 42 therein for reception of the ends 44 and 46 of a shade roller 48 provided with a recess 50 therein in which a spring 52 is positioned and engaged on and about the rod 54 of which the end 46 of the roller 48 is a part. This forms a shade roller about which the shade 56 is positioned, the shade having one edge thereof secured to the roller 48 and having the other edge thereof clampingly received between the flanges 58 and 60 of a substantially tubular bottom edging rod 62.

The bottom edging rod 62 has a slot 64 therein within which the twisted end 66 of a hook member 68 is positioned, the hook being adapted to be engaged under a latch 70 secured as by a fastener 72 to the molding 74 as is generally conventionally provided for the window 10.

Figure 4:
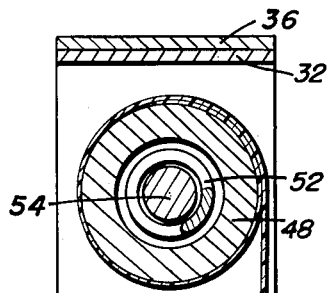
Figure 4 is a vertical sectional view as taken along the plane of line 4—4 in Figure 2.
Figure 6:
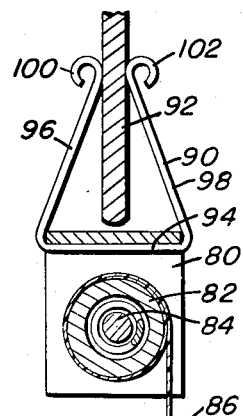
Figure 6 is a sectional view similar to that of Figure 4 showing a modified form of the invention.

In Figure 6 there is shown a modified form of the invention in which there is provided a housing 80 which carries a roller 82 having a spring thrust rod 84 so as to form a shade roller which will enable the shade 86 to be adjusted up or down. The shade 86 is, of course, provided with a bottom edging 88.

The housing 80 is adapted to be attached by suitable resilient clamps 90 to the sun visor 92 as is conventionally provided in many makes and models of automotive vehicles. The clamp 90 has a central lower connecting portion 94 and upwardly convergingly extending arms 96 and 98 which terminate in arcuate visor engaging ends 100 and 102.

The housing 80 by utilization of the clamps 90 may be easily attached and detached from the visor 92.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A sun visor for an automotive vehicle comprising a housing, means for pivotally mounting said visor on the vehicle for positioning in alignment with a window thereof, a shade roller rotatably mounted in said housing, a substantially transparent shade attached to said roller and having a bottom edging rod attached thereto, and a hook slidably adjustably secured to said rod, said means including a mounting plate having an ear attached thereto, a mounting link adjustably pivotally attached to said ear, a bar adjustably pivotally secured to said link, said housing being of substantially inverted U-shape and having a slot therein, said bar extending through said slot to support and reinforce said housing.

2. A sun visor for an automotive vehicle comprising a housing, means for pivotally mounting said visor on the vehicle for positioning in alignment with a window thereof, a shade roller rotatably mounted in said housing, a substantially transparent shade attached to said roller and having a bottom edging rod attached thereto, and a hook slidably adjustably secured to said rod, said bottom edging rod being of tubular construction and having upwardly extending flanges clampingly embracing said shade, said means including a mounting plate having an ear attached thereto, a mounting link adjustably pivotally attached to said ear, a bar adjustably pivotally secured to said link, said housing being of substantially inverted U-shape and having a slot therein, said bar extending through said slots to support and reinforce said housing.

References Cited in the file of this patent

UNITED STATES PATENTS

| | | |
|---|---|---|
| 303,332 | Snell | Aug. 12, 1884 |
| 1,455,475 | Bullock | May 15, 1923 |
| 1,468,750 | Sechrist | Sept. 25, 1923 |
| 2,237,700 | Goldman | Apr. 8, 1941 |
| 2,297,996 | Wolfe | Oct. 6, 1942 |
| 2,528,038 | Crise | Oct. 31, 1950 |

FOREIGN PATENTS

| | | |
|---|---|---|
| 665,300 | France | May 6, 1929 |
| 244,277 | Great Britain | Dec. 17, 1925 |